Nov. 13, 1951  W. L. FRAMPTON  2,574,634
IRRIGATING MACHINE
Filed April 3, 1946
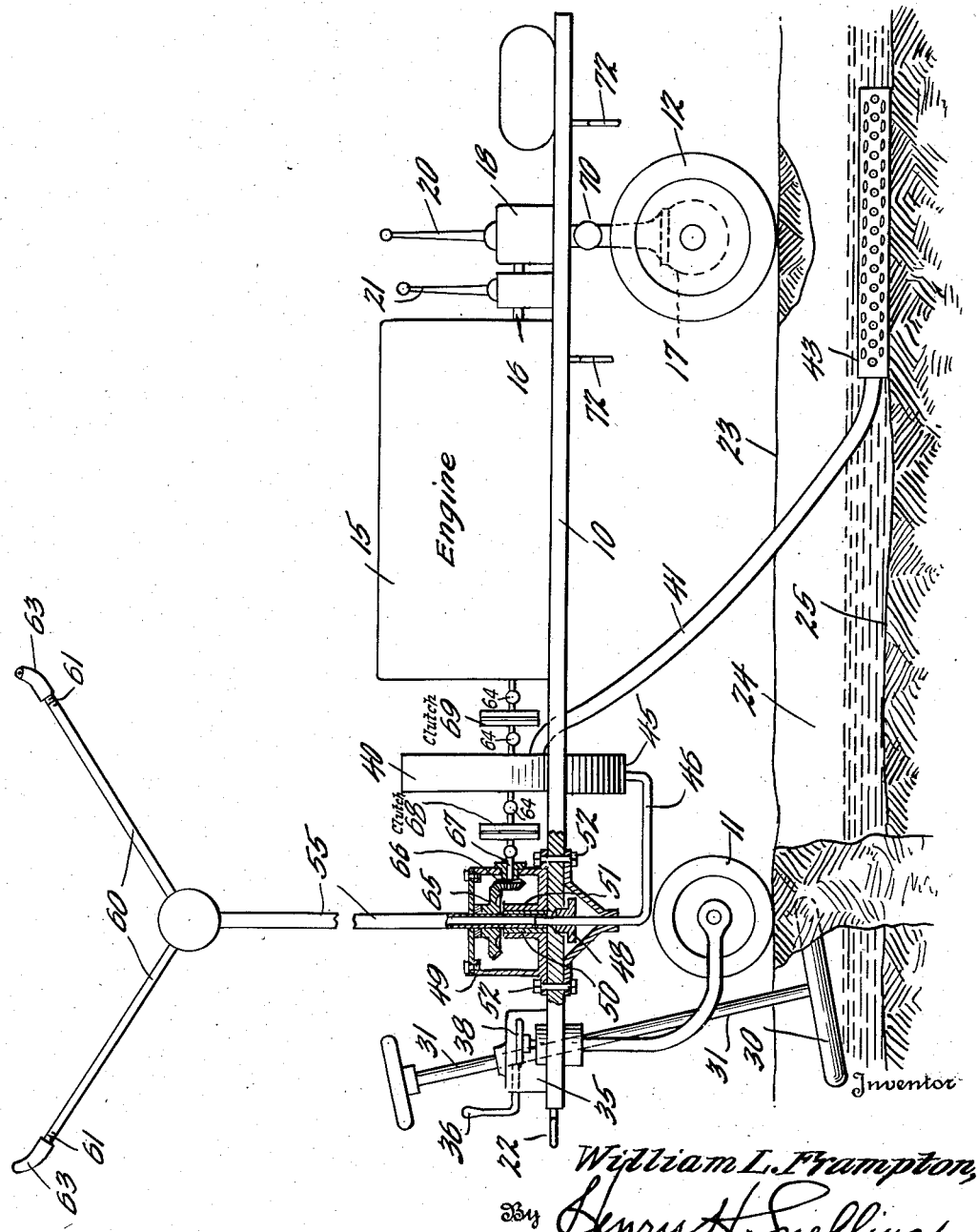

Patented Nov. 13, 1951

2,574,634

UNITED STATES PATENT OFFICE 2,574,634

IRRIGATING MACHINE

William L. Frampton, Lincoln, Nebr.

Application April 3, 1946, Serial No. 659,265

12 Claims. (Cl. 299—52)

This invention relates to irrigation mechanism and has for its principal object the provision of a traveling machine that will withdraw transient water from a meandering supply ditch and throw it for a considerable distance, thus permitting the use of ditches spaced relatively much further apart than is now the custom. The machine of this invention is ideal for use in porous rough land, that is, where the land is pocketed by many slight depressions with intermediate rises, the land sloping from the hills or mounds in different directions, or where the depth of the useful soil precludes levelling of the ground to permit usual types of surface irrigation.

In accord with the present invention, the ditches, while naturally relatively level, can follow the contour of the land and the irrigating machine will distribute water from these irrigating ditches over practically any type of surface, up to an angle of slope of ground where erosion is a factor and even here the ground may be terraced about a particularly steep mound. Since the machine can be driven at varying speeds practically any conditions can well be cared for and there is little danger with proper handling of the machine of the eroding of a light sandy soil or the puddling of a fairly heavy clay soil.

A prime feature of my machine is the fact that I can control the pressure of the water, the distance the water is thrown and the total amount of water that a chosen small area shall receive. This is very important as even a small difference in the amount of water delivered will have considerable influence upon the rate of growth of the plants, this varying with the particular crop being cultivated, running from the gentle spray for tender young plants to the heavy watering required for an alfalfa field in mid-August.

With a machine such as here presented both soil and water are conserved in addition to the natural saving in cost and operation had by the avoidance of levelling, border checking, and terracing. While a very deep soil, not too rough, can nicely be levelled there are many cases in which this means a loss of soil as it would necessarily remove the top soil from the high spots of the field, leaving them with only a slight depth of productive soil, and a consequent excess of top soil where the depressions were formerly. A saving in the quantity of water used is of particular value where the cost of this is quite high as I am able to let the water into the irrigation ditch just as my machine is started and I can arrange the travel and volume of water thrown in such a manner that the ditch will be pumped substantially dry when the machine which straddles the water supply ditch, and is guided by it, completes its run, thereby securing a minimum of waste of water.

Inasmuch as stationary irrigating machines using the sprinkling system are known and are actually in use, it is only necessary to call attention to the fact that in a machine of this type it is preferable that the rate at which the sprinkling arms deliver water to the soil should generally be a bit slower than the rate at which the soil will absorb it in order to avoid puddling, run-off, or erosion. Further general suggestions for proper control of the rate of irrigation under varying conditions will be found in government publications such as Farmers' Bulletin No. 1922, entitled Practical Irrigation.

An important object of the invention is to provide a simple and efficient irrigating machine which will automatically follow the curves of an irrigating ditch while straddling the ditch, therefore making it unnecessary for the workman to be on the vehicle. The vehicle is sufficiently light so that when it has travelled to the end of the ditch it may continue its journey slightly so as to clear the depression and then be pulled around to the next adjacent ditch at either the far end or to the water delivery end. The machine is economically sound and can be used on low or high crops, including corn, orchards, etc. and its fully automatic features permits its use on such low priced crops as oats, rye, etc. or even pastures.

The drawing is an elevation of my device partly in section. The chassis 10 is mounted on four wheels, the front wheels 11 normally being free to turn, although steerable, as will be later described, and the rear wheels 12 are power driven from the source of power 15, preferably an internal combustion engine, although obviously any other self-contained prime mover can be used. The engine shaft 16 is connected to the driving wheels 12 through the differential 17 and transmission 18 controlled by the gear shaft lever 20, 21 representing the usual clutch lever to free the propelling mechanism from the source of power so that it can be used while the vehicle is stationary.

Any type of connection between the prime mover and the driving wheels may be used but obviously in a device of this type it is highly preferable that the transmission shall depart from the normal truck transmission to provide very much lower speeds. At the present time it is my intention to drive the vehicle when irrigating but for the sake of economy, it is convenient to move the vehicle which is relatively light from place to place by other means than its own power as indicated by the ring 22 at the front of the vehicle. The four wheels 11 and 12 are intended to rest on the bank 23 of a ditch 24 the bottom of which is indicated by the line 25. The vehicle straddles this ditch 24 and follows the curves of the ditch by means of a guide wheel 30 which turns freely about shaft 31 which slopes rearwardly at an angle so that the guide wheel 30 as it engages the sloping banks of the ditch tends to run down these slopes and thus maintain the vehicle in proper straddling relation with respect to the ditch. The shaft 31 does not turn and is clamped in sleeve 35 at the desired elevation, that is, to engage the ditch when the vehicle is in use or to clear it entirely at the end of the run. A locking lever 36 holds the shaft 31 in chosen elevation. The hand wheels 38 may be used to guide the front wheels 11, but normally there is no occasion for such guiding as the wheel 30 makes the machine quite automatic in this regard.

The numeral 40 represents a rather powerful centrifugal pump. It receives water centrally through the pipe 41 which is non-collapsible and relatively flexible and leads from a cylindrical metal screen 43 which is dragged on the bottom of the ditch and strains the water to prevent injury to the pump. At its periphery, preferably at the bottom as at 45, the pump discharges to a hose 46 which need not be flexible as it leads through packing 48 in the gear housing 49, discharging through a sleeve 50 pressed into the housing case 51 which is secured in any manner to the chassis 10 as for example by the bolts 52. A hollow rotating shaft 55 receives water from the pipe 46 under relatively great pressure and discharges this water through a number of arms 60, preferably only two in number, having at their free ends threaded portions 61 to which any one of a series of nozzles may be secured to provide various types of sprays as may be needed on the different crops. A beveled gear 65 pressed and keyed to the rotating shaft 55 meshes with a pinion 66 on shaft 67 coaxial with the engine shaft. I find it convenient to separate the sections of this shaft by universal joints and to provide clutches such as 68 and 69 whereby the clutch 68 will disconnect the power drive of the shaft 55 and its rotating arms 60 so that water received from the pump 40 turns the shaft 55 solely by reaction, much the same as the so-called jet effect lawn sprinklers. The clutch 69 disconnects both the pump and the rotating shaft 55.

Between the transmission 18 and differential 17 I mount an automatic measuring device of any type which differs from the conventional in reading in yards rather than in tenths of miles. This device 70 cuts off the conventional ignition of the motor 15 when the number of yards set on its dial have been driven. This feature enables me to start my irrigating machine at the water entry end of the ditch and by setting the dial to 325 yards for example, which is the measured length of the ditch, the machine will automatically travel to the end of the ditch and then stop.

The operation of the device is as follows:

The machine has been placed to straddle the ditch at one or the other end of it and the irrigating ditch is now filled with water. The distance that the rotating arms will throw water is about 150 feet, consequently a strip of land 100 yards wide may be irrigated. Assuming a heavy discharge of water is desired, the angled nozzles 63 are unscrewed from the arms 60 and the arms are perfectly free at their ends, thus giving the highest discharge of water. The engine is now started and the clutch 21 thrown into gear at the lower speed which should be such as to wet down the strip of ground to be watered with an inch of water. The pump is started by throwing the clutch 69 and the clutch 68 is thrown to drive the hollow shaft 55 by power and at its highest speed. The guide wheel 30 engages the side walls of the ditch whenever there is a change in direction and this keeps the vehicle constantly straddling the ditch. The pump sucks water through the strainer 43 and the pipe 41 and discharges the water under pressure through pipes 46 and 55. On reaching the end of the ditch as set by the metering device 70, the engine is automatically stopped. The operator in due season throws the clutch 21 into neutral, lifts the flexible pipe 41 and its strainer 43 on to the several carrier hooks 72, raises the guide wheel 30 by releasing the locking lever 36 and sliding the shaft 31 upward and then re-locking it in raised position. While the machine could be driven to its next position, I find it much more convenient to tow it to its next position by means of an eye hook 22. If, for example, instead of desiring to throw a heavy amount of water a long distance we should desire to spray a narrow bed of newly transplanted cabbage plants, as a typical case; we would operate somewhat differently. In this case, when the machine was astride the irrigating ditch which probably would be full of water, the suction hose line 41 is dropped down and the guide wheel 30 is lowered to perhaps 6 inches to the bottom 25 of the irrigating ditch and is then locked in place. A type of angled ends 63 would be screwed on the rotating arms to give the finest spray. The clutch 68 would of course be thrown out as it would not be desired to power-rotate the arms under these conditions. When the engine is started the pump operates as usual, but the rotating arms 60 are now set in motion slowly by reaction and are whirled around at a reasonable speed, much the same as occurs with an ordinary small-size lawn sprinkler. The gear shift 20 is set for high forward gear and the irrigating machine advances much more rapidly than in the previous case, distributes a light spray over the entire length of the cabbage plants and comes to a stop when it has reached the yardage set on the meter 70 and the cycle is repeated in the next adjacent ditch.

What I claim is:

1. In an irrigating machine to straddle a water supply ditch, a wheel supported vehicle, means engaging the walls of the ditch to guide the vehicle to follow the direction of the ditch, a pump mounted on the vehicle, a source of power, means for connecting and disconnecting said source at will to the pump to discharge water and to the wheels of the frame to propel the vehicle, a hollow rotatable shaft, hollow arms carried by said shaft, means selectively connecting the shaft for rotation by said source of power, and means for conveying water from the ditch to the pump and from the pump to the arms.

2. The device of claim 1 in which the shaft is vertical, the arms have removable oppositely directed tangential ends, the source of power is a motor having a change speed transmission, and the selectively disconnecting means is a clutch for disconnecting the source of power from the hollow vertical shaft and its arms, so the arms may rotate by water pressure alone, whereby when the clutch is disconnected the discharge of water is a gentle spray over a narrow strip when the vehicle travels at high speed, and by removing the arm ends, engaging the clutch, and driving the vehicle at a slow speed a great volume of water may be discharged to a distance of fifty yards on both sides of the ditch.

3. The device of claim 1 in which the source of power is a motor, the pump is immediately in front of the motor and a vehicle speed selector mechanism located in rear of the motor is connected to the propelling wheels of the vehicle.

4. In an irrigating machine for straddling a meandering water supply ditch having two side walls, a chassis having two rear wheels and also having two front wheels movable about vertical axes to turn with the chassis, a guide wheel below the level of the four wheels and moving about a substantially vertical axis, mounted centrally of the chassis near the front thereof, and engaging one or the other of the two walls of the ditch to cause the front of the chassis to follow the course of the ditch, and means carried in part by the chassis for drawing water from the ditch and discharging the water on both sides of the ditch.

5. The device of claim 4, in which the means includes a vertically positioned pipe and a motor driven pump discharging into said pipe.

6. The device of claim 4, including a rear wheel driving mechanism.

7. The device of claim 4 in which the guide wheel is mounted on a shaft adjustably carried by the chassis whereby the guide wheel may be lowered into the ditch to a chosen depth.

8. The device of claim 4 in which the axis is a shaft sloping at an angle of about 5° and the shaft may be adjustably clamped to the chassis.

9. A sprinkler including vertical pipe having upwardly diverging arms, angled tangential nozzles detachably secured to the free ends of the arms to cause the pipe to rotate when water is forced through the pipe and the pipe is free to rotate, power driven means for rotating the pipe, and clutch means for connecting and disconnecting the power driven means and the vertical pipe, whereby the speed of rotation of the arms may be altered at will to provide a light or a heavy discharge of irrigating water, the tangential nozzles rotating the vertical pipe by reaction at one speed which speed is increased by connecting the power driven means to the vertical pipe thus increasing at will the speed of rotation of the pipe over that given by the angled nipples alone.

10. The device of claim 1 in which the wall engaging means includes a guide wheel rotatable in a nearly horizontal plane and alternately engages one or the other of the side walls of the ditch.

11. The device of claim 1 in which the wall engaging means includes a shaft extending downwardly from the vehicle, means to hold the shaft with its lower end beneath the level of the wheels of the vehicle, a guiding wheel freely rotatable on said shaft, the shaft sloping at an angle of very roughly 5°, whereby the wheel tends to ride downwardly one one or the other of the two side walls of the ditch.

12. In combination, a self-propelled vehicle traveling at any one of a plurality of speeds while straddling a water supply ditch, slopping power driven rotating means on said vehicle for throwing water to both sides of the vehicle at a chosen angle, means carried by the vehicle to engage the sides of the ditch to guide the vehicle to cause it to follow the direction of the ditch, and means to draw water from the ditch as the vehicle travels, to supply the water throwing means, whereby by altering the speed of the vehicle the amount of water thrown on a given area may be varied without altering the angle at which the water is discharged over the land.

WILLIAM L. FRAMPTON.

REFERENCES CITED

The following references are of record in the file of this patent:

UNITED STATES PATENTS

| Number | Name | Date |
|---|---|---|
| 1,068,796 | Mathers | July 29, 1913 |
| 1,068,797 | Mathers | July 29, 1913 |
| 1,107,119 | Searle | Aug. 11, 1914 |
| 1,658,202 | Jones | Feb. 7, 1928 |
| 1,726,986 | Horten | Sept. 3, 1929 |
| 1,759,988 | Knapp | May 27, 1930 |
| 1,855,459 | Strandlun | Apr. 26, 1932 |
| 1,919,703 | Nielsen | July 25, 1933 |
| 2,074,251 | Braun | Mar. 16, 1937 |
| 2,331,144 | Sitter | Oct. 5, 1943 |